United States Patent [19]
Boudreau et al.

[11] Patent Number: 5,479,540
[45] Date of Patent: Dec. 26, 1995

[54] PASSIVELY ALIGNED BI-DIRECTIONAL OPTOELECTRONIC TRANSCEIVER MODULE ASSEMBLY

[75] Inventors: Robert A. Boudreau, Hummelstown; Hongtao Han, Mechanicsburg; Ervin H. Mueller, Harrisburg; John R. Rowlette, Sr., Hummelstown, all of Pa.; Jared D. Stack, Charlotte, N.C.

[73] Assignee: The Whitaker Corporation, Wilmington, Del.

[21] Appl. No.: 382,946

[22] Filed: Feb. 1, 1995

Related U.S. Application Data

[63] Continuation of Ser. No. 269,301, Jun. 30, 1994, abandoned.

[51] Int. Cl.[6] .............................. G02B 6/34; G02B 6/42
[52] U.S. Cl. ................... 385/14; 385/37; 385/49; 385/92
[58] Field of Search .................... 385/14, 49, 92, 385/88, 94, 37, 31

[56] References Cited

U.S. PATENT DOCUMENTS

| | | | |
|---|---|---|---|
| 4,210,923 | 7/1980 | North et al. | 257/432 |
| 4,671,603 | 6/1987 | McQuoid et al. | 359/15 |
| 4,701,010 | 10/1987 | Roberts | 385/31 |
| 4,826,272 | 5/1989 | Pimpinella et al. | 385/92 |
| 4,871,224 | 10/1989 | Karstensen et al. | 385/14 |
| 4,897,711 | 1/1990 | Blonder et al. | 257/48 |
| 4,904,036 | 2/1990 | Blonder | 385/14 |
| 4,916,497 | 4/1990 | Gaul et al. | 385/14 |
| 4,945,400 | 7/1990 | Blonder et al. | 385/15 |
| 4,946,253 | 8/1990 | Kostuck | 359/15 |
| 4,989,934 | 2/1991 | Zavracky et al. | 385/14 |
| 4,995,695 | 2/1991 | Pimpinella et al. | 385/92 |
| 5,005,939 | 4/1991 | Arvanitakis et al. | 385/15 |
| 5,061,027 | 10/1991 | Richard | 385/14 |
| 5,073,003 | 12/1991 | Clark | 385/33 |
| 5,082,339 | 1/1992 | Linnebach | 385/14 |
| 5,101,460 | 3/1992 | Richard | 385/37 |
| 5,123,067 | 6/1992 | Avelange et al. | 385/14 |
| 5,123,073 | 6/1992 | Pimpinella | 385/59 |
| 5,127,075 | 6/1992 | Althaus et al. | 385/94 |
| 5,170,269 | 12/1992 | Lin et al | 359/9 |
| 5,202,775 | 4/1993 | Feldman et al. | 359/11 |
| 5,237,434 | 8/1993 | Feldman et al. | 359/19 |
| 5,327,443 | 7/1994 | Tanaka et al. | 372/36 |
| 5,357,103 | 10/1994 | Sasaki | 250/227.24 |
| 5,357,590 | 10/1994 | Auracher | 385/33 |
| 5,359,686 | 10/1994 | Galloway et al. | 385/49 |

OTHER PUBLICATIONS

"Gigabit Transmitter Array Modules on Silicon Waferboard"—Armiento, et al., *IEEE Transactions on Components, Hybrids, and Manufacturing Technology*, vol. 15, No. 6—Dec. 1992.

*Primary Examiner*—John D. Lee
*Attorney, Agent, or Firm*—William S. Francos

[57] ABSTRACT

A passively aligned bi-directional optoelectronic transceiver module assembly utilizes a computer generated hologram as a diffractor to split/combine light beams of two different wavelengths. The entire assembly is constructed of monocrystalline silicon which is photolithographically batch processed to provide a low cost, compact structure with precision tolerances which is inherently passively aligned upon assembly.

20 Claims, 3 Drawing Sheets

PASSIVELY ALIGNED BI-DIRECTIONAL OPTOELECTRONIC TRANSCEIVER MODULE ASSEMBLY

This application is a Continuation of Application Ser. No. 08/269,301 filed Jun. 30, 1994, now abandoned.

BACKGROUND OF THE INVENTION

This invention relates to optical transmission and, more particularly, to an optoelectronic transceiver module assembly for terminating a bi-directional optical fiber.

Packages for optoelectronic devices terminating optical fibers and utilizing silicon processing technology are known, as exemplified by U.S. Pat. No. 4,897,711 to Blonder et al. The '711 patent discloses a subassembly for use in packaging an optoelectronic device (e.g., LED or photodiode) which includes a silicon base and lid having a variety of etched features (e.g., grooves, cavities, alignment detents) and metalization patterns (e.g., contacts, reflectors) which enable the device to be mounted on the base and coupled to the fiber. Specifically, a subassembly according to the Blonder et al patent is for use with unidirectional transmission over the optical fiber. It would be desirable to have such a package which can be utilized in a bi-directional transmission system.

It is therefore a primary object of the present invention to provide an assembly for terminating an optical fiber which transmits information bi-directionally.

It is a further object of this invention to provide such an assembly which is manufactured by utilizing silicon processing techniques to keep the cost low, the package small and the tolerances precise.

It is yet another object of this invention to achieve high precision small packages for such an assembly which are thermally stable and allow batch processing to achieve low cost.

SUMMARY OF THE INVENTION

The foregoing, and additional, objects of this invention are attained by providing an assembly for terminating an optical fiber which transmits information bi-directionally, transmission of information in a first direction within the fiber being effected by light at a first wavelength and transmission of information in a second direction within the fiber being effected by light at a second wavelength. The assembly comprises a monocrystalline material support member having a major planar surface and a planar monocrystalline material base member secured to the support member major planar surface. The base member is formed with first and second through apertures each having four side walls formed by crystallographic planes of the monocrystalline material oblique to the support member major planar surface. The apertures are in the form of truncated pyramids and the base member is oriented so that the truncated pyramids are inverted, with the smaller openings of both the apertures being adjacent the support member major planar surface. A first reflective layer is disposed on a side wall of the first aperture and a light source is mounted to the support member major planar surface within the first aperture of the base member, the light source being selectively controllable to generate a light beam at the first wavelength directed to the first reflective layer so that the light beam is reflected to exit the larger opening of the first aperture. A light detector is mounted to the support member major planar surface within the second aperture of the base member and has a light sensitive surface area exposed to a received light beam entering the larger opening of the second aperture. The light detector is responsive to light at the second wavelength impinging on the light sensitive surface area for providing a predetermined electrical signal. A planar monocrystalline material lid is secured to the base member over the first and second apertures, the lid being transparent to light at the first and second wavelengths. A monocrystalline material cover member having a major planar surface is secured to the lid, the cover member having a cavity in its major planar surface capable of receiving an end portion of the optical fiber. The cavity has an end face formed by a crystallographic plane of the monocrystalline material which is oblique to the cover member major planar surface and a second reflective layer is disposed on that end face. Further, a diffractor is secured to the lid in the vicinity of the cover member cavity. The diffractor and the first and second reflective layers are so arranged that light exiting the fiber is reflected by the second reflective layer, passes through the diffractor and is directed through the lid to the light sensitive surface area of the light detector. At the same time, light generated by the light source is reflected by the first reflective layer, passes through the lid and the diffractor, is directed to the second reflective layer and is reflected by the second reflective layer along a path so that it enters the optical fiber.

In accordance with an aspect of this invention, the assembly further includes means for hermetically sealing the base member to the support member and means for hermetically sealing the lid to the base member.

In accordance with another aspect of this invention, the diffractor comprises a computer generated hologram. More specifically, the diffractor comprises two superimposed radially symmetric computer generated holograms, one for each of the first and second wavelengths of light.

In accordance with yet another aspect of this invention, the diffractor comprises a radially symmetric computer generated hologram formed in the lid.

In accordance with a further aspect of this invention, the support member, the base member, the lid and the cover member are all formed from monocrystalline silicon which is processed by photolithographic etching to form the apertures of the base member and the cavity of the cover member.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 2:
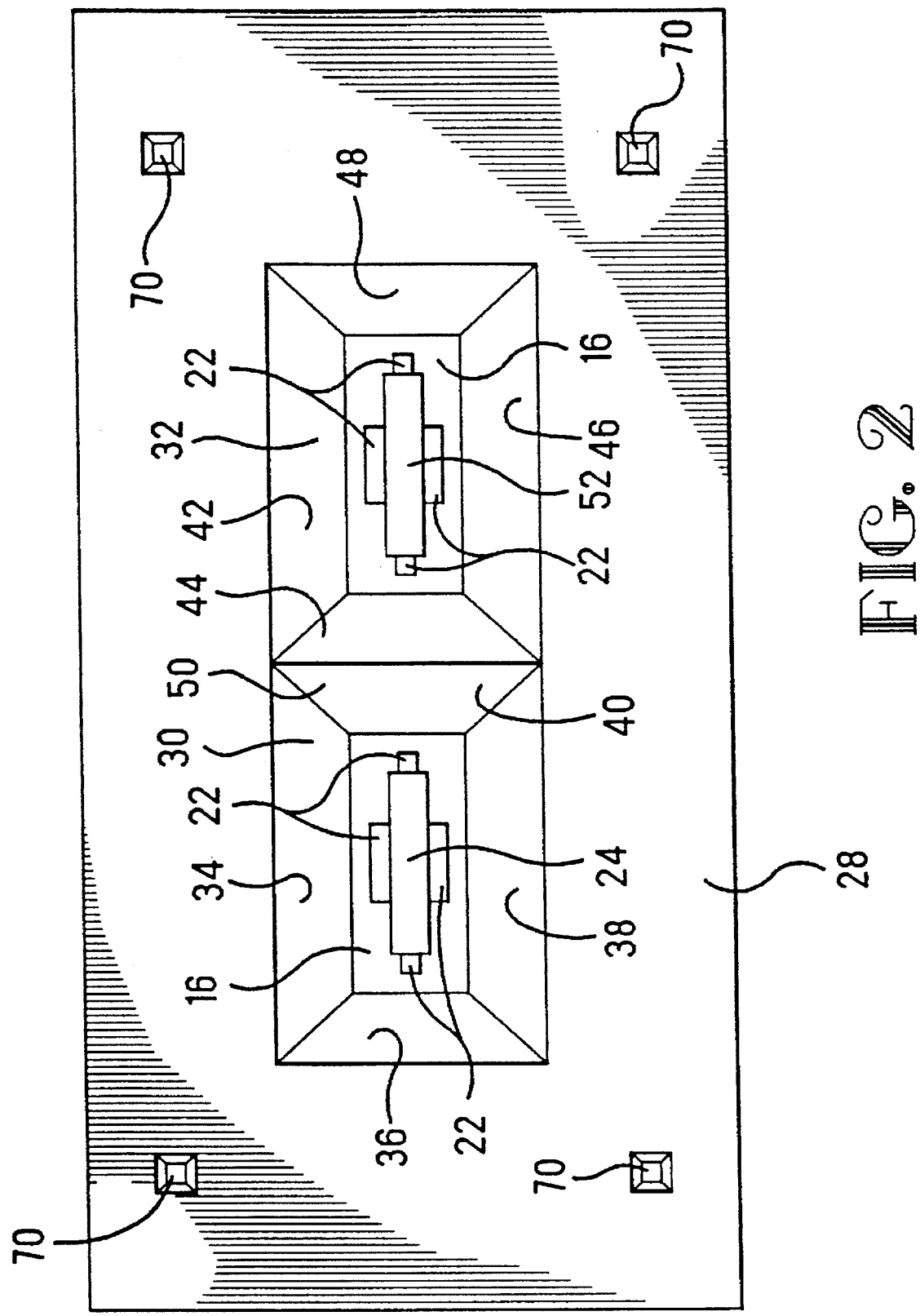
FIG. 2 is a top plan view of the base member taken along the line 2—2 in FIG. 1.
Figure 3B:
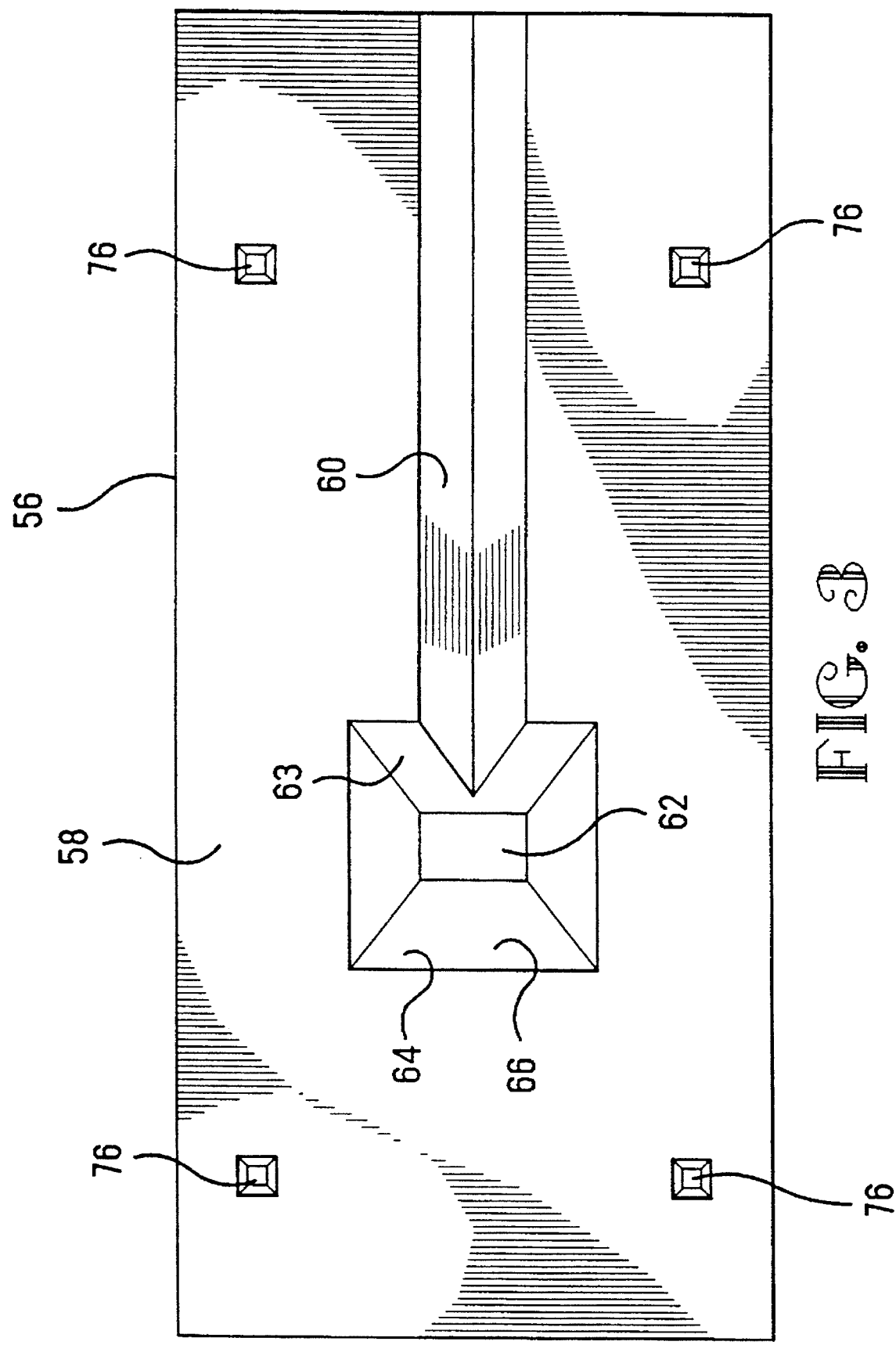
FIG. 3 is a bottom plan view of the cover member taken along the line 3—3 in FIG. 1.

When utilizing single mode optical fibers, precision tolerances for the optoelectronic interface are required because of the small numerical aperture of the fiber. Thus, all such interface packages must be precisely aligned. It is advantageous that such alignment be "passive", rather than "active", active alignment being where the optoelectronic devices are operating during the alignment process. Using silicon processing techniques, packages which are passively aligned have been developed, as disclosed for example in the aforereferenced Blonder et al patent. The package illustrated in FIGS. 1–3 herein provides such passive alignment for a bi-directionally transmitting optical fiber. With such bi-directional transmission, transmission of information in a first direction within the optical fiber is effected by light at a first wavelength (e.g., 1.3 μm) and transmission of information in a second direction within the optical fiber is effected by light at a second wavelength (e.g., 1.55 μm).

Figure 1:
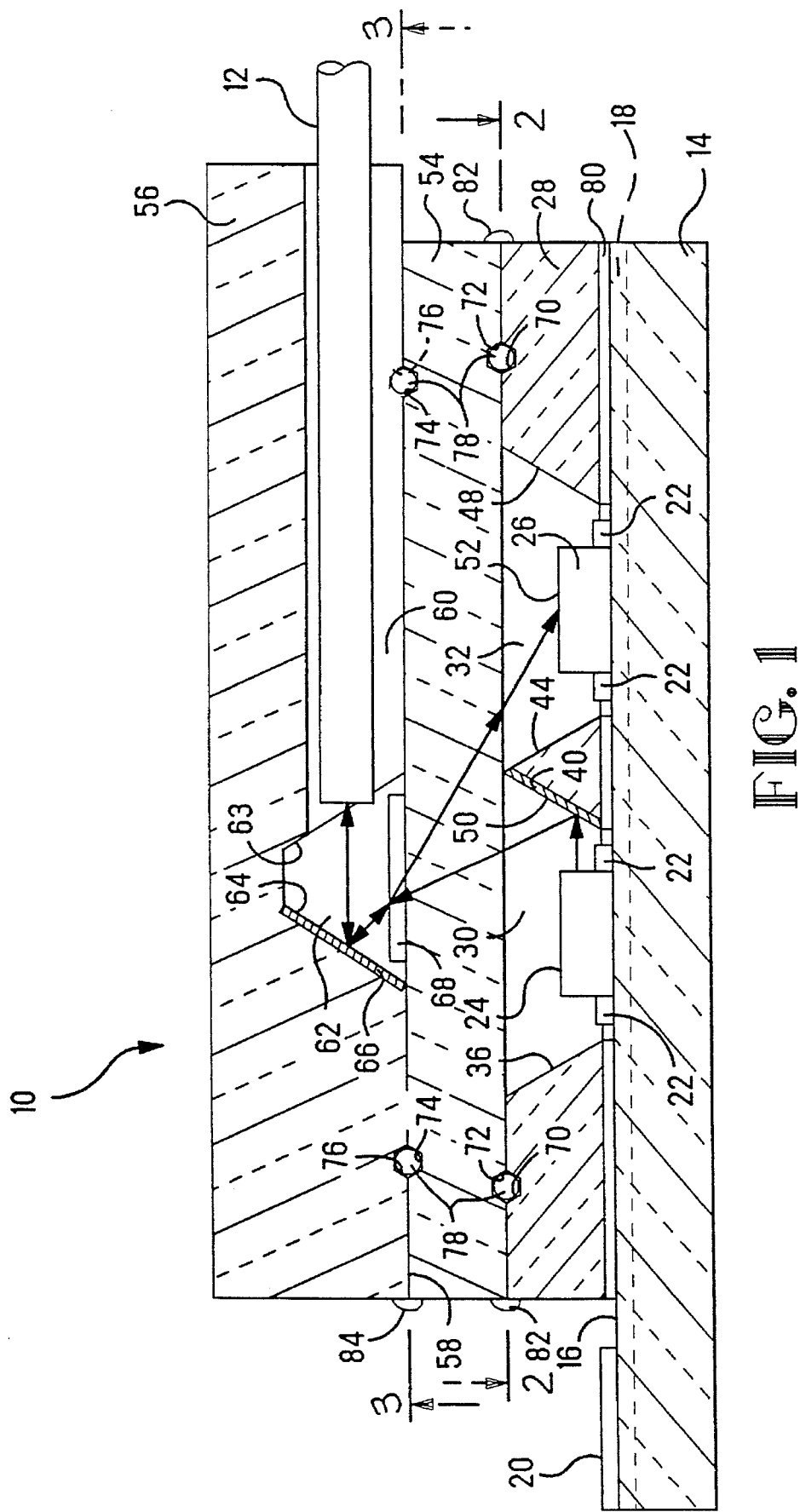
FIG. 1 is a cross sectional view schematically illustrating an assembly constructed in accordance with the principles of this invention.

As shown in FIG. 1, the inventive package, designated generally by the reference numeral 10, terminates an optical fiber 12. All of the major parts of the package 10 are formed of monocrystalline silicon, precisely machined in a known manner either by photolithographic wet etching or by reactive ion etching. The package 10 includes a support member 14 formed from a silicon wafer board (sometimes referred to as a silicon bench). The support member 14 has a major planar surface 16 on which are disposed recessed conductive traces 18. Wire bond pads 20 in electrical contact with the conductive traces 18 are provided for interconnection with external circuitry. Formed on the surface 16 are alignment pedestals 22 and standoffs (not shown). The alignment pedestals 22 and the standoffs are produced by utilizing reactive ion etching to remove parts of the surface 16 so as to provide vertical walls for the pedestals and standoffs. The pedestals 22 and the standoffs are for the purpose of aligning the optoelectronic devices 24, 26 mounted to the surface 16, as is known in the art.

Secured to the surface 16 of the support member 14 is a base member 28. Like the support member 14, the base member 28 is formed of monocrystalline silicon, and has planar top and bottom surfaces in the {100} crystallographic plane. Utilizing photolithographic wet etching, the apertures 30 and 32 are formed side-by-side. The etching exposes the {111} crystallographic planes of the silicon and results in four side walls each at an oblique angle of 54.7° to the planar surfaces of the base member 28, as is well known. Thus, the aperture 30 is defined by the side walls 34, 36, 38, 40 and the aperture 32 is defined by the side walls 42, 44, 46 and 48. The wall 34 is parallel to the wall 42; the wall 36 is parallel to the wall 44; the wall 38 is parallel to the wall 46; and the wall 40 is parallel to the wall 48. The apertures 30 and 32 are each in the form of a truncated pyramid and when the base member 28 is mounted to the support member 14, it is so oriented that the pyramids are inverted, with their smaller openings being adjacent the surface 16 of the support member 14. On the wall 40, which is the side wall of the aperture 30 adjacent the aperture 32, there is disposed a reflective layer 50. The layer 50 may be formed by any known technique, such as vacuum evaporation, sputtering or electroplating.

As an alternative construction, only a single aperture may be formed in the base member 28. A generally pyramidal structure, having the wall 40 with the reflective layer 50 thereon, would then be separately formed, placed within the aperture on the support member surface 16, and bonded in place. Alignment of this structure would be by suitable pedestals and standoffs on the surface 16.

A light source 24 is mounted to the surface 16 of the support member 14 in an area defined by the alignment pedestals 22 within the aperture 30. The light source 24 may be, illustratively, an edge emitting light emitting diode (ELED) or a laser that is connected to suitable ones of the traces 18 so that it may be selectively controlled to generate a light beam at the first wavelength (e.g., 1.3 μm). This light beam is directed toward the reflective layer 50 so that it is reflected thereby to exit the larger opening of the aperture 30, as shown by the arrows in FIG. 1. Similarly, the light detector 26 is mounted to the surface 16 in the space defined by the alignment pedestals 22 and the standoffs within the aperture 32. The light detector 26 has a light sensitive upper surface area 52 which is exposed to a received light beam entering the larger opening of the aperture 32. The light detector 26 is connected to respective ones of the wire traces 18 and is responsive to light at the second wavelength (e.g., 1.55 μm) for providing a predetermined electrical signal on the respective traces 18.

Covering the base member 28 is a planar monocrystalline silicon lid 54. The lid 54 is transparent to light at both the first and second wavelengths.

Completing the assembly is a monocrystalline silicon cover member 56 having a major planar surface 58 in the {100} crystallographic plane of the silicon. Using a photolithographic wet etching process on the surface 58, there is formed an enlarged cavity capable of receiving an end portion of the fiber 12. As shown, the cavity preferably includes an elongated V-groove 60 and an enlarged cavity 62 in the shape of a truncated pyramid. The V-groove 60 intersects the cavity 62 along the wall 63. The cavity 62 is formed with an end face 64 opposite the intersecting wall 63. The end face 64 is formed by a {111} crystallographic plane of the silicon which is transverse to the longitudinal axis of the V-groove 60 (and likewise transverse to the longitudinal axis of fiber 12) and is oblique to the surface 58. A reflective layer 66 is deposited on the end face 64 as by, for example, a vacuum evaporation, sputtering or electropating technique.

A diffractor 68 is secured to the lid 54 in the vicinity of the enlarged cavity 62. The diffractor 68 and the reflective layers 50, 66 are so arranged that light at the second wavelength exiting the fiber 12 is reflected by the reflective layer 66, passes through the diffractor 68 and is directed through the lid 54 to the light sensitive surface area 52 of the light detector 26, as shown by the arrows in FIG. 1. Light at the first wavelength generated by the light source 24 is reflected by the first reflective layer 50, passes through the lid 54 and the diffractor 68, is directed to the second reflective layer 66 and is reflected by the second layer 66 along a path so that it enters the optical fiber 12, as illustrated by the arrows in FIG. 1.

Preferably, the diffractor 68 is a computer generated hologram. Specifically, the diffractor 68 comprises two superimposed radially symmetric computer generated holograms, one for each of the first and second wavelengths of light. Such a diffractor may be manufactured in accordance with the teachings of U.S. Pat. No. 5,202,775 to Feldman et al. The diffractor 68 can either be made integrally as part of the lid 54 or may be made separately and then bonded to the lid 54.

For alignment purposes, the base member 28 is formed with a first plurality of alignment detents 70 in its upper surface. Such detents may take the form of truncated pyramids and are formed by a photolithographic wet etching process. Similarly, the lower surface of the lid 54 is formed with the same first plurality of alignment detents 72 and its upper surface is formed with a second plurality of alignment detents 74. Finally, the lower surface of the cover member 56 is formed with a second plurality of alignment detents 76. Each respective pair of alignment detents 70, 72 and 74, 76 carries a respective alignment ball 78 therein. The alignment detent pairs 70, 72 and 74, 76 are so placed on their respective surfaces that registration of the alignment detent pairs results in proper alignment of the components of the package 10, as is known.

In the manufacturing and assembly process for the package 10, the support member 14, base member 28, lid 54 and cover member 56 are batch machined (i.e., etched) as described above, as parts of enlarged monocrystalline silicon wafers in the {100} crystallographic plane. The reflective layers 50, 66 are deposited on their respective walls. The conductive traces 18, the wire bonds 20 and the optoelectronic devices 24, 26 are assembled to the support member 14. The base member 28 is then secured in place to the support member 14 by a bond 80. The bond 80 may be, illustratively, electrostatic, adhesive, solder, glass frit, fusion, etc. The balls 78 are placed in the detents 70 and the lid 54 is placed over the base member 28 so that the balls 78 go into the detents 72. Balls 78 are then placed in the detents 74 of the lid 54. The optical fiber 12 is inserted in the V-groove 60 of the cover member 56, which provides passive alignment of the fiber 12 to the cover member 56, and then suitably bonded in place. The cover member 56 is then placed over the lid 54 so that the balls 78 enter the detents 76. Due to the precise silicon machining by etching, the package 10 is passively aligned upon assembly. The joint between the base member 28 and the lid 54 can then have a ring of solder 82 securing the lid 54 to the base member 28. Similarly, a ring of solder 84 can be used to secure the cover member 56 to the lid 54. The bond 80 and the solder 82 advantageously provide a hermetic seal for the optoelectronic devices 24, 26.

The package 10 has been described for the situation where light at the first wavelength enters the fiber 12 from the light source 24 and light at the second wavelength exits the fiber 12 and is directed to the light detector 26. At the other end of the fiber 12 is a similar package wherein the roles of the first and second wavelengths of light are reversed. Accordingly, at that other end, the light source generates light at the second wavelength and the light detector is sensitive to light at the first wavelength. The diffractor 68 would then be designed differently for each end of the fiber 12 because the two wavelengths of light would have to be directed differently.

The foregoing design is extremely advantageous. The package 10 can be made very small. Illustratively, the length of the package 10 can be on the order of 1 cm and the height of each layer can be on the order of 500 μm, where the fiber 12 has a diameter of 125 μm. The nature of the silicon wafer board processed by photolithography etching results in a very small structure with precision tolerances. The package has very few parts —it is an integrated structure. Since the groove for the fiber and the surface for the second reflective layer are integrally manufactured, passive alignment is attainable. This structure allows for bi-directional transmission over a single mode fiber, thereby making it very efficient. Economy is achieved because all of the parts are fabricated by high precision lithography in a batch process.

Accordingly, there has been disclosed an improved optoelectronic transceiver module assembly for terminating a bi-directional optical fiber. While an illustrative embodiment of the present invention has been disclosed herein, it is understood that various modifications and adaptations to the disclosed embodiment will be apparent to those of ordinary skill in the art and it is only intended that this invention be limited by the scope of the appended claims.

What is claimed is:

1. An assembly (10) for terminating an optical fiber (12) which transmits information bi-directionally, transmission of information in a first direction within the fiber being effected by light at a first wavelength and transmission of information in the second direction within the fiber being effected by light at a second wavelength, the assembly comprising:

a monocrystalline material support member (14) having a major planar surface (16);

a planar monocrystalline material base member (28) secured to said support member major planar surface, said base member being formed with first (30) and second (32) through apertures each having four side walls (34, 36, 38, 40, 42, 44, 46, 48) formed by crystallographic planes of the monocrystalline material which are oblique to said support member major planar surface, said apertures being in the form of truncated pyramids and said base member being oriented so that the truncated pyramids are inverted with the smaller openings of both said apertures adjacent said support member major planar surface;

a first reflective layer (50) disposed on a side wall (40) of said first aperture;

a light source (24) mounted to said support member major planar surface within said first aperture of said base member, said light source being selectively controllable to generate a light beam at said first wavelength directed to said first reflective layer so that said source light beam is reflected by said first reflective layer to exit the larger opening of said first aperture;

a light detector (26) mounted to said support member major planar surface within said second aperture of said base member, said light detector having a light sensitive surface area (52) exposed to a received light beam entering the larger opening of said second aperture, said light detector being responsive to light at said second wavelength impinging on said light sensitive surface area for providing a predetermined electrical signal;

a planar monocrystalline material lid (54) secured to said base member over said first and second apertures, said lid being transparent to light at said first and second wavelengths;

a monocrystalline material cover member (56) having a major planar surface (58) secured to said lid, said cover member having a cavity (60, 62) in its major planar surface capable of receiving an end portion of said optical fiber (12), said cavity having an end face (64) formed by a crystallographic plane of the monocrystalline material which is oblique to said cover member major planar surface;

a second reflective layer (66) disposed on said cover member cavity end face (64); and a diffractor (68) secured to said lid in the vicinity of said cover member cavity;

wherein said diffractor and said first and second reflective layers are so arranged that:
 (a) light at said second wavelength exiting said fiber (12) is reflected by said second reflective layer (66), passes through said diffractor (68) and is directed through said lid (54) to said light sensitive surface area (52) of said light detector (26); and
 (b) light at said first wavelength generated by said light source (24) is reflected by said first reflective layer (50), passes through said lid (54) and said diffractor (68), is directed to said second reflective layer and is reflected by said second reflective layer along a path so that it enters said optical fiber (12).

2. The assembly according to claim 1 further including:

means (80) for hermetically sealing said base member to said support member; and means (82) for hermetically sealing said lid to said base member.

3. The assembly according to claim 1 wherein said diffractor comprises a computer generated hologram.

4. The assembly according to claim 3 wherein said diffractor (68) comprises a radially symmetric computer generated hologram.

5. The assembly according to claim 4 wherein said diffractor comprises two superimposed radially symmetric computer generated holograms, one for each of said first and second wavelengths of light.

6. The assembly according to claim 3 wherein said diffractor comprises a computer generated hologram integrally formed in said lid.

7. The assembly according to claim 3 wherein said diffractor comprises a separately formed computer generated hologram bonded to said lid.

8. The assembly according to claim 1 wherein said support member, said base member, said lid and said cover member are all formed from monocrystalline silicon which is processed by photolithographic wet etching to form the apertures of said base member and the cavity of said cover member.

9. The assembly according to claim 8 wherein the major surfaces of said monocrystalline silicon base member and cover member are in the {100} crystallographic plane of the silicon and the etching exposes a {111} crystallograpic plane of the silicon.

10. The assembly according to claim 1 wherein said base member is formed with a first plurality of alignment detents (70) on its surface facing said lid, said lid is formed with an equal first plurality of alignment detents (72) on its surface facing said base member and a second plurality of alignment detents (74) on its surface facing said cover member, and said cover member is formed with an equal second plurality of alignment detents (76) on its surface facing said lid, the assembly further comprising a first plurality of alignment balls (78) each in a respective pair (70, 72) of alignment detents of said base member and said lid and a second plurality of alignment balls (78) each in a respective pair (74, 76) of alignment detents of said lid and said cover member.

11. The assembly according to claim 1 wherein said apertures (30, 32) of said base member (28) are in side-by-side alignment with each of the side walls of each aperture being parallel to a respective side wall of the other aperture.

12. The assembly according to claim 11 wherein said first reflective layer (50) is disposed on that side wall (40) of said first aperture (30) which is adjacent said second aperture (32).

13. An assembly (10) for terminating an optical fiber (12) which transmits information bi-directionally, transmission of information in a first direction within the fiber being effected by light at a first wavelength and transmission of information in the second direction within the fiber being effected by light at a second wavelength, the assembly comprising:

a monocrystalline material support member (14) having a major planar surface (16);

a planar monocrystalline material base member (28) secured to said support member major planar surface, said base member being formed with a through aperture (30,32), said aperture having an opening remote from said support member major planar surface;

structure secured to said support member major planar surface within said aperture of said base member, said structure having a wall (40) oblique to said support member major planar surface;

a first reflective layer (50) disposed on said wall (40) of said structure;

a light source (24) mounted to said support member major planar surface within said aperture of said base member, said light source being selectively controllable to generate a light beam at said first wavelength directed to said first reflective layer so that said source light beam is reflected by said first reflective layer to exit the remote opening of said aperture;

a light detector (26) mounted to said support member major planar surface within said aperture of said base member, said light detector having a light sensitive surface area (52) exposed to a received light beam entering the remote opening of said aperture, said light detector being responsive to light at said second wavelength impinging on said light sensitive surface area for providing a predetermined electrical signal;

a planar monocrystalline material lid (54) secured to said base member over said aperture, said lid being transparent to light at said first and second wavelengths;

a monocrystalline material cover member (56) having a major planar surface (58) secured to said lid, said cover member having a cavity (60, 62) in its major planar surface capable of receiving an end portion of said optical fiber (12), said cavity having an end face (64) formed by a crystallographic plane of the monocrystalline material which is oblique to said cover member major planar surface;

a second reflective layer (66) disposed on said cover member cavity end face (64); and a diffractor (68) secured to said lid in the vicinity of said cover member cavity;

wherein said diffractor and said first and second reflective layers are so arranged that:

(a) light at said second wavelength exiting said fiber (12) is reflected by said second reflective layer (66), passes through said diffractor (68) and is directed through said lid (54) to said light sensitive surface area (52) of said light detector (26); and (b) light at said first wavelength generated by said light source (24) is reflected by said first reflective layer (50), passes through said lid (54) and said diffractor (68), is directed to said second reflective layer and is reflected by said second reflective layer along a path so that it enters said optical fiber (12).

14. The assembly according to claim 13 wherein said base member aperture includes a pair of apertures (30,32) each in the form of an inverted truncated pyramid, said pair of apertures being side-by-side so that said structure is formed by base member material separating said pair of apertures, said light source being within a first (30) of said apertures and said light detector being within a second (32) of said apertures, and said wall (40) being a side wall of said first aperture.

15. A Passively Aligned Bi-directional Optoelectronic Module, comprising:

a. A support member having a top surface and a bottom surface, said support member having disposed on said top surface a light source and a light detector as well as a base member having a top surface and a bottom surface, said base member having at least one aperture selectively etched from said top surface to said bottom surface, said apertures having sidewalls at well defined angles, at least one of said sidewalls of said at least one aperture having a reflecting surface disposed thereon; and b. A optically transparent lid having a top surface and a bottom surface, said lid disposed on said top surface of said base member, said lid having disposed on said top surface of said lid a diffractor for wavelength separation and a cover member, said cover member having a selectively v-shaped groove having a first end and a second, said second end terminating into a selectively etched cavity, said cavity having an endface, said endface having a reflective surface disposed thereon, and said v-shaped groove having an optical fiber disposed therein, whereby light transmitted to and from said optical fiber is reflected from said endface of said cavity, is diffracted by said diffractor, is transmitted through said lid, is impingent on said reflective surface of said at least one wall of said sidewalls of said at least one aperture having a reflective surface disposed thereon to said detector and from said light source.

16. A Passively Aligned Bi-Directional Optoelectronic Module as recited in claim 15, wherein said diffractor is a hologram.

17. A Passively Aligned Bi-Directional Optoelectronic Module as recited in claim 15, wherein said support member, said base member and said cover member are made of monocrystalline material and said groove, said cavity and said at least one aperture are formed by etching said monocrystalline material to expose well defined crystalline planes.

18. A Passively Aligned Bi-Directional Optoelectronic Module as recited in claim 15, wherein said lid, said cover member and said base member have selectively disposed alignment detents for receiving alignment balls therein, whereby the elements of the Module are passively aligned.

19. A Passively Aligned Bi-Directional Optoelectronic Module as recited in claim 17, wherein said support member, said base member said lid and said cover member are made of monocrystalline material having respective major surfaces in the (100) crystalline plane and said groove, said cavity and said at least one aperture are formed by etching said monocrystalline material to expose crystalline planes in the (110) crystalline planes.

20. A Passively Aligned Bi-Directional Optoelectronic Module as recited in claim 15, wherein said optical fiber supports an optical signal of first and second wavelength, said first wavelength being emitted from said light source and said second wavelength being detected by said light detector.

* * * * *